Dec. 28, 1948.                C. W. EARP                2,457,136
              ARRANGEMENT FOR FREQUENCY MEASUREMENTS
                        Filed Jan. 16, 1945
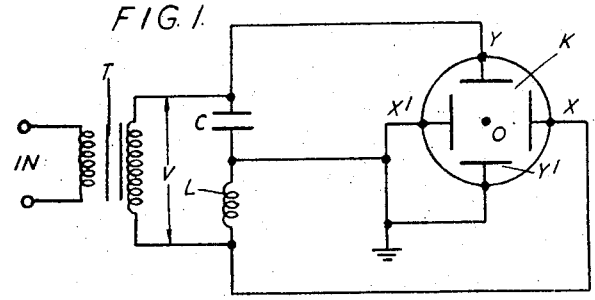
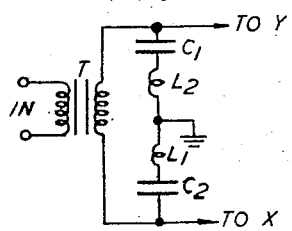
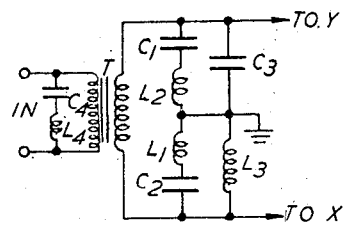
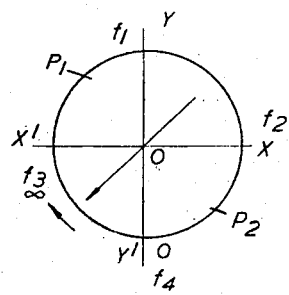
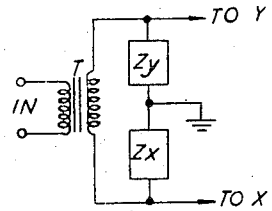
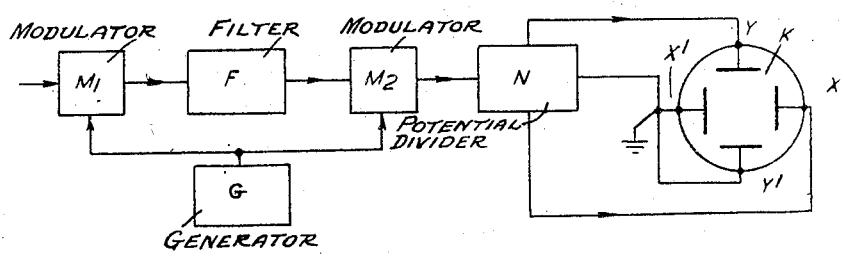
Inventor
CHARLES WILLIAM EARP
By
Edward W. Whinney
Attorney Patented Dec. 28, 1948

2,457,136

UNITED STATES PATENT OFFICE 2,457,136

ARRANGEMENT FOR FREQUENCY MEASUREMENTS

Charles William Earp, London, England, assignor, by mesne assignments, to International Standard Electric Corporation, New York, N. Y., a corporation of Delaware Application January 16, 1945, Serial No. 573,103 In Great Britain December 8, 1943

Section 1, Public Law 690, August 8, 1946 Patent expires December 8, 1963

5 Claims. (Cl. 172—245)

The present invention relates to arrangements for measuring the frequency of an electrical signal and provides extensions of the arrangements described and claimed in the specification of application No. 479,123, filed March 13, 1943, now Patent No. 2,434,914, granted January 27, 1948, which will be referred to throughout this specification as the "parent specification". The present application is a continuation in part of the prior application referred to.

The principal object of the invention is to provide another method of obtaining the control voltage for the indicating instrument giving improved control over the frequency scale obtained. Another object is to provide means for selecting for measurement one component of a composite signal wave to the exclusion of other components.

According to the invention, there is provided an arrangement for measuring the frequency of an electric signal wave, comprising a potential divider which includes two series-connected network portions solely composed of reactive elements and having different reactance characteristics, means for applying the signal wave to the potential divider, and means for separately applying the potential differences obtained across the said network portions to control a measuring instrument in such manner that it gives an automatic indication of the said frequency.

The invention also provides an arrangement for measuring the frequency of a component of a composite electric signal wave, comprising frequency changing means including an electrical filter for selecting the said wave component to the exclusion of other wave components, means for deriving from the selected component two voltages in the same or opposite phase, the frequency characteristic curves of the said voltages being different, and means for applying the said voltages to control a measuring instrument in such a manner that it automatically indicates the frequency of the selected component.

The invention further provides an arrangement for measuring the frequency of a component of a composite electrical signal wave comprising frequency changing means including an electrical filter for selecting the said wave component to the exclusion of other components, a potential divider composed solely of reactive elements and having two portions with different reactance characteristics, means for applying the selected component to the potential divider, and means for applying two separate voltages obtained respectively from the said portions to control a measuring instrument in such a manner that it gives an automatic indication of the frequency of the selected wave component.

The invention will be described with reference to the accompanying drawing in which:

Fig. 1 shows a schematic circuit diagram of the simplest arrangement according to the invention;

Figs. 2 and 3 show modifications of Fig. 1 giving a wider frequency scale;

Fig. 4 shows a diagram to explain the action of Fig. 3;

Fig. 5 shows a modification of Fig. 1 to exhibit the most general arrangement, of which Figs. 1, 2 and 3 are particular cases; and Fig. 6 shows a block schematic diagram of an arrangement for selecting a particular frequency component from a composite signal, and for measuring its frequency on an indicating instrument.

In the parent specification, there are described arrangements for producing a straight line trace on the screen of a cathode ray oscillograph, the orientation of the trace depending on the frequency of the signal applied, thereby providing a convenient method of indicating or measuring the frequency. For this purpose various arrangements are described to produce two voltages in the same or in opposite phase for application respectively to the plates of the oscillograph, the relative values of the voltages depending on the signal frequency. The present invention covers some further arrangements for obtaining such pairs of voltages giving a considerable flexibility of choice of conditions without undue complication. The arrangements are particularly useful when the frequency to be measured may vary over a number of octaves.

The accompanying Fig. 1 shows the simplest arrangement according to the present invention. A signal whose frequency is to be indicated is applied at the terminals IN through a transformer T to a potential divider comprising an inductance L and capacity C connected in series, the junction point being connected to the deflecting plates $X^1$ and $Y^1$ of the cathode ray oscillograph K, which plates may be connected to earth as indicated. The plates X and Y are respectively connected to those terminals of the inductance L and capacity C which are also connected to the transformer T. If V is the signal voltage developed across the secondary winding of the transformer, and $p$ is $2\pi$ times the signal frequency, then the potentials of the plates Y and X will be $V/(1-p^2LC)$ and $Vp^2LC/(1-p^2LC)$ respectively, and these are always in the same phase, so that the trace will be a straight line which is confined to the quadrants XOY and $X^1OY^1$. At very low frequencies the potential of X approaches zero and the trace will practically coincide with $YOY^1$, while at very high frequencies the potential of Y will be practically zero, and the trace will nearly coincide with $XOX^1$. This, of course, is on the assumption that the resistance of the inductance can be neglected. This assumption can be generally justified, though at very low frequencies, the resistance will not be negligible, and will have the effect of making the trace slightly elliptical.

The length of the trace on the oscillograph screen will vary with the frequency of the signal because the effective load produced by the elements L and C varies, so that the voltage V is not a constant. At the resonance frequency of L and C, the potentials of the plates X and Y will not be infinite as might be concluded from the formulae given above, because under this condition V is substantially zero. The two potentials are, however, equal so that the trace will bisect the angle XOY, and its length will depend on the current delivered to the potential divider, and this depends on the circuit from which the signal components are derived, and on the design of the transformer T. It has been found that this transformer can usually be so chosen that the trace length is nearly constant over the frequency range of interest.

By the arrangement of Fig. 1, the whole frequency range from zero to infinity will be indicated over an angle of 90° on the screen of the oscillograph. By adding other reactive components to L and C, this angular range may be greatly extended.

In Fig. 1 the trace never can quite reach the main axis $YOY^1$ (or $XOX^1$) for very low (or very high) frequencies, since there is always a small residual voltage in the X (or Y) direction. Fig. 2 shows a modification of Fig. 1 in which the two parts of the potential divider comprise series resonant systems $L_1C_2$ and $L_2C_1$ respectively. If, for example, $L_1$ and $C_2$ are chosen to resonate at some frequency $f_1$ then the X voltage is zero at that frequency and a truly vertical trace is obtained. Furthermore, if $L_2$ and $C_1$ are chosen to resonate at some higher frequency $f_2$ then likewise a horizontal trace will be obtained for this frequency. For frequencies below $f_1$, the combination $L_1C_2$ will have a negative reactance and the trace will move anti-clockwise into the quadrants $X^1OY$ and $XOY^1$. For frequencies above $f_2$ the trace will move clockwise into these same quadrants. At zero and infinite frequencies the trace will be located in these quadrants at positions determined practically by the ratios $C_1/C_2$ and $L_1/L_2$ respectively, so that the total orientation range available will be of the order of 180°.

In the system of Fig. 2, the frequency scale is spread out over a wider range than in Fig. 1, and will be considerably less compressed at the extremities of the range. The scale is still rather irregular and may be further improved by the addition of extra reactive components as shown in Fig. 3. In this case the X and Y portions of the potential divider are shunted respectively by an inductance $L_3$ and capacity $C_3$.

The inductance $L_3$ introduces a parallel resonance at a frequency $f_3$ below the series resonance frequency $f_1$ of $L_1$ and $C_2$. As the signal frequency descends through $f_1$ towards $f_3$, the X voltage passes through zero and then changes sign and increases negatively more rapidly than before as the frequency $f_3$ is approached. The effect of $L_3$ is therefore to spread out the frequency scale in the region between $f_1$ and $f_3$. Similarly the capacity $C_3$ introduces a parallel resonance at a frequency $f_4$ above the series resonance frequency $f_2$ of $L_2$ and $C_1$, and the upper end of the frequency range is spread out in like manner.

At the frequencies of parallel resonance $f_3$ and $f_4$ the corresponding portions of the potential divider have very high impedances so that one of the deflecting voltages in each case is practically zero. However, in this condition the resistance of the inductance coils cannot be entirely neglected, and so the smaller deflecting voltage is not quite zero and will be in quadrature with the longer one. A slightly elliptical trace will thus be obtained at and near the parallel resonance frequencies $f_3$ and $f_4$, and the main axis of the trace approximately coincides with the axes $XOX^1$ and $YOY^1$ respectively. At zero and infinite frequencies the trace nearly coincides with $YOY^1$ and $XOX^1$ respectively, but will tend to be slightly elliptical.

The changes which occur as the frequency varies from zero to infinity can be understood in the following way with reference to Fig. 4. Let one end of the trace be supposed to be identified as by the arrow-head shown. At zero frequency the arrow is pointing downwards to $Y^1$. As the frequency rises, the arrow head rotates clockwise until it points to $X^1$ at the first parallel resonance frequency $f_3$. Continuing, it points in turn to Y at the first series resonance frequency $f_1$, to X at the second series resonance frequency $f_2$, to $Y^1$ again at the second parallel resonance frequency $f_4$, and finally to $X^1$ again at infinite frequency. Over part of the range, vary from 0 to $f_3$ and from $f_4$ to infinity the trace will be slightly elliptical.

Referring to Fig. 3, it is to be noted that at some frequency $f_5$ near the high frequency extremity of the range the potential divider as a whole has a series resonance which may produce abnormally large deflections. These deflections may be equalised by shunting the primary winding of the transformer with a suitable selected series resonant circuit $L_4C_4$, as shown, adapted to resonate at the frequency $f_5$. This shunt could alternatively be connected across the secondary winding so as to shunt the potential divider directly.

It will be understood from the explanations which have been given that the arrangement of Fig. 3 has a useful orientation range of something like 360°. The following values of components were used in a particular case:

| | |
|---|---|
| $L_1$—6 henries | $C_1$—0.005 microfarad |
| $L_2$—2 henries | $C_2$—0.015 microfarad |
| $L_3$—50 henries | $C_3$—0.005 microfarad |
| $L_4$—0.25 henry | $C_4$—0.002 microfarad |

These values produced the following approximate values for the resonance frequencies:

| | |
|---|---|
| $f_1$ | 500 p:s |
| $f_2$ | 1,500 p:s |
| $f_3$ | 170 p:s |
| $f_4$ | 5,000 p:s |
| $f_5$ | 7,000 p:s |

The frequencies corresponding to the two 45° positions $P_1$ and $P_2$ in Fig. 4 are about 300 p:s and 3000 p:s, and at 10,000 p:s the trace is very nearly horizontal, the arrow head pointing towards $X^1$. A substantially perfect straight line trace is obtained over the 180° range $P_1$ to $P_2$, and then may be further extended to 360° without excessive ellipticity to cover the frequency range from about 170 to 10,000 p:s.

The examples given in Figs. 1, 2 and 3 may be further extended as shown more generally in Fig. 5. Here the potential divider comprises two reactive portions $Z_x$ and $Z_y$ each of which consists solely of reactive elements, and there may be any number of such elements. It is well known that any two-terminal network of reactive elements can be reduced to one of four forms exhibiting alternate series and parallel resonances, the frequencies of which may be chosen as desired. (See, for example, "Transmission Networks and Wave Filters," by T. E. Shea, chap. 5, paragraph 32.) By using reactance networks having more than two resonance frequencies for $Z_x$ and $Z_y$, the scale of the trace can be further spread out. Additional resonant shunts may be connected across the primary or secondary winding of the transformer T to deal with any additional resonances of the whole potential divider.

It will be understood that while the reactive elements comprising the portions $Z_x$ and $Z_y$ should ideally have no resistance components, this is in practice impossible; and it has been stated that the effect of such resistance (when appreciable) is to introduce an undesirable ellipticity into the trace. The term "reactive element" is therefore to be understood to mean one employed primarily for its reactive properties, with the resistance component reduced as far as is practicable and not taking any effective part in the production of the desired results, but rather being detrimental, as explained.

It will be further appreciated that the portions $Z_x$ and $Z_y$ must have dissimilar reactance characteristics; in particular they should have different resonance frequencies. This is strictly true also of the limiting case of Fig. 1 where the two resonance frequencies are zero and infinity. If, for example, $Z_x$ and $Z_y$ both consisted of a single inductance, or had similarly shaped characteristics, the desired result would not be obtained.

The arrangements which have been described are particularly useful in altimeters and obstacle detectors where a continuous indication of the frequency of a signal is required. If the oscillograph screen is provided with a polar diagram type of scale, the length and position of the trace can be used for checking amplitude-frequency characteristics of amplifiers and similar equipment.

Where a number of different signal frequencies are simultaneously present the arrangement shown in Fig. 6 is very convenient. Incoming signals are applied to a modulator $M_1$ supplied from a variable frequency oscillation generator G. The side-bands so obtained are passed to a narrow band-pass filter F and thence to a second modulator $M_2$ supplied in parallel with $M_1$ from G. When the generator G is adjusted so that a side-band frequency is produced which will pass through F, the particular frequency component of the signal which produces the side-band will be recovered from $M_2$, all other components being excluded. The component so recovered is applied to a network N for providing the deflecting voltages for the cathode ray tube K. The network N may be of the kind already described with reference to Figs. 1 to 5, or any of the corresponding arrangements described in the parent specification. The frequency of the selected component may then be measured on the oscillograph in the manner already explained.

If the generator G be caused to scan continuously over a range of frequencies by any suitable means simultaneous indications of all the frequency components present in the signal will be obtained on the oscillograph screen. Thus the arrangement is directly applicable to panoramic reception, and no time base has to be provided for the oscillograph. As has already been explained the lengths and orientations of the various traces can be employed to measure the amplitudes and frequencies of the various signal components. In cases like this the most suitable rate of scanning and selectivity of the filter F depend on the complexity of the signal. If the frequency components are not too close together, the filter may be given a moderately wide band and scanning may be rapid while still obtaining satisfactory traces. If, however, there are a large number of components rather close together, the filter will have to be highly selective and scanning must therefore be slow in order to give the filter time to respond, and also to get clearly visible traces. In this case it may be desirable to use an oscillograph screen which gives a persistent image.

The filter F may be made adjustable both as to the position and width of the pass band. The measurements do not depend on the stability of the generator or filter since the function of these elements is merely to pick out the components which are to be measured; the accuracy of measurement is principally determined by passive networks whose characteristics can easily be maintained very constant. The modulator $M_1$ and $M_2$ do not need to be of the balanced type, since by suitable choice of the filter F, the generated frequency can be well separated from that of any signal component.

By use of an appropriate switching arrangement, a number of different potential dividing networks may be provided and selected so that various frequency scales may be obtained on the oscillograph to suit various types of received signal.

What is claimed is:

1. An arrangement for measuring the frequency of an electrical signal wave comprising a potential divider which includes two series-connected network portions solely composed of reactive elements and having different reactance characteristicts, means for applying the signal wave to the potential divider, a measuring instrument, means for separately applying the potential differences obtained across the said network portions to said measuring instrument to indicate frequency, and means comprising at least one series resonant circuit connected in shunt with the potential divider to improve the uniformity of response of said instrument.

2. An arrangement according to claim 1 comprising a transformer having a primary and a secondary winding, said secondary winding being connected to the potential divider, and means for applying the signal wave to the primary winding of the transformer.

3. An arrangement according to claim 1 further comprising a transformer having a primary and a secondary winding, said secondary winding being connected to said potential divider, and means for applying the signal wave to the primary winding of said transformer, and wherein the said series resonant circuit is connected to shunt the primary winding of the transformer.

4. An arrangement according to claim 1 in which the measuring instrument is a cathode ray oscillograph.

5. An arrangement according to claim 1 in which the measuring instrument is a cathode ray oscillograph having two pairs of deflecting plates, one plate of each pair being connected to the common point of the two portions of the potential divider, and the remaining plates being connected respectively to the extremities of the said divider.

CHARLES WILLIAM EARP.

REFERENCES CITED

The following references are of record in the file of this patent:

UNITED STATES PATENTS

| Number | Name | Date |
|---|---|---|
| 1,711,101 | Shanck | Apr. 30, 1929 |
| 2,153,612 | Chireix | Apr. 11, 1939 |
| 2,233,751 | Seeley | Mar. 4, 1941 |
| 2,313,699 | Roberts | Mar. 9, 1943 |
| 2,320,476 | Schrader et al. | June 1, 1943 |
| 2,369,268 | Trevor | Feb. 13, 1945 |
| 2,374,817 | Hardy | May 1, 1945 |

FOREIGN PATENTS

| Number | Country | Date |
|---|---|---|
| 297,954 | Germany | July 12, 1919 |